United States Patent

[11] 3,571,600

[72] Inventor Irwin Rubin
Van Nuys, Calif.
[21] Appl. No. 656,830
[22] Filed July 28, 1967
[45] Patented Mar. 23, 1971
[73] Assignee Sensor Technology, Inc.
Van Nuys, Calif.

[54] OPTICAL READER UNIT INCLUDING MULTIPLE LIGHT-SENSITIVE CELLS EACH WITH CONTIGUOUS AMPLIFIERS
9 Claims, 3 Drawing Figs.

[52] U.S. Cl. .......... 250/208, 250/211, 250/214, 250/219, 330/24, 330/59
[51] Int. Cl. .......... H01j 39/12
[50] Field of Search .......... 250/208, 209, 211, 219 (Id), 219 (Idc), 211 (J), 214; 330/59, 24; 307/311

[56] References Cited

UNITED STATES PATENTS

| | | | |
|---|---|---|---|
| 3,475,617 | 10/1969 | Chaimowicz | 250/239 |
| 3,486,029 | 12/1969 | Barrett et al. | 317/235.22 |
| 3,155,831 | 11/1964 | Goodwin et al. | 250/214X |
| 3,238,357 | 3/1966 | Minka | 250/219Idc |
| 3,341,785 | 9/1967 | Merryman et al. | 330/24X |
| 3,366,889 | 1/1968 | Avins | 330/24X |

OTHER REFERENCES

Symbold Dictionary, Electronic Bayer' s Guide, July 20, 1960 p. R 42

Guydosh and Hryck, " Light-Controlled Read-Only Storage," IBM Technical Disclosure Bulletin, Vol. 9, No 1, June 1966 p. 87

*Primary Examiner*—James W. Lawrence
*Assistant Examiner*—C. M. Leedom
*Attorney*—Flam and Flam

ABSTRACT: The optical reader comprises a number of light-sensitive cells 20 integrally formed on a silicon base. The cells are supported upon a contact layer 32 adhered to a glass substrate 30. Arrayed in adjacent columns in line with the respective cells are individual amplifier circuits. Each circuit comprises transistor chips X1 and X2 adhered to the substrate, a printed resistor chip R and suitable interconnecting conductors. The substrate and components carried thereby are fitted in a reader head or holder 10 incorporating suitable collimating and image-forming apparatus. The signals from the reader have sufficient strength for direct coupling to logic circuits.

INVENTOR.
IRWIN RUBIN
By Flam and Flam
ATTORNEYS.

OPTICAL READER UNIT INCLUDING MULTIPLE LIGHT-SENSITIVE CELLS EACH WITH CONTIGUOUS AMPLIFIERS

BACKGROUND OF THE INVENTION

This invention relates to optical readers designed to cooperate with digital computers or other logic equipment. Known reader cells produced for industry produced signals of extremely low power levels. Typical values might be 100 to 1,000 microamps at, say, 0.5 volts. It has been standard practice for manufacturers of logic equipment to provide in the logic package, amplifiers for boosting the power to levels within the designed capabilities of the logic circuits. The low level signal from the reader cell necessarily travels through a length of conductor to the amplifier structure; consequently, noise of comparably low level obliterates the signal and injects spurious responses. The problem is especially significant in the event that the reader is remote from the logic package. Expensive shielded cables have been provided with more or less success; amplifiers in the logic package are objectionable from the standpoint of space and cost.

In order to overcome these disadvantages, I provide a reader module incorporating a number of reader cells in which amplifier circuits are provided as physical adjuncts of the cells themselves, all compactly arranged so that the size of the reader package itself is not materially increased. For this purpose, I provide a common substrate both for the light-sensitive cells and for components of the amplifier circuits. Furthermore, the light-sensitive cells are themselves formed by surface sectioning of a large silicon base.

This invention possesses many other advantages and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

DETAILED DESCRIPTION

Figure 1:
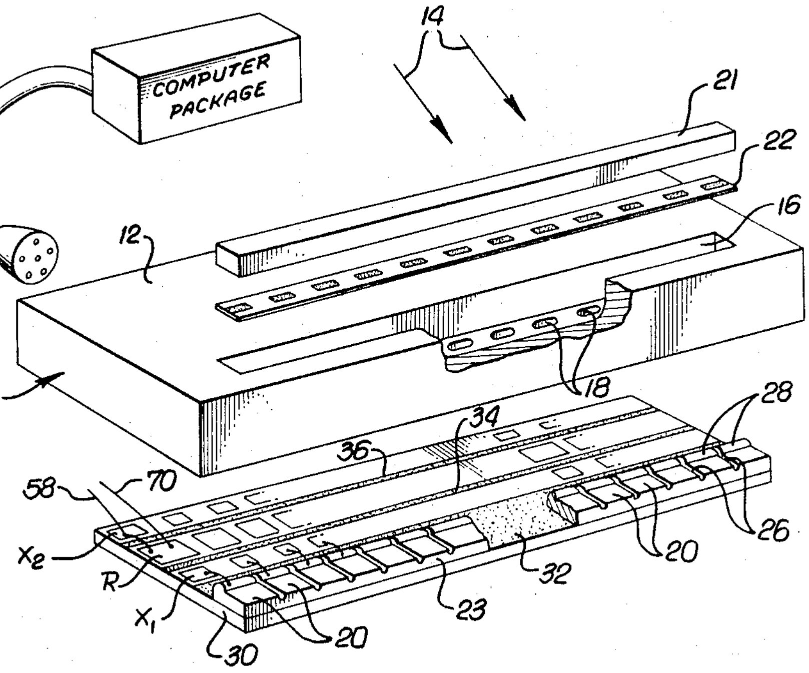
FIG. 1 is an exploded view of an optical reader incorporating the present invention, most of the interconnecting leads being omitted for clarity, part of the silicon strip and a part of the reader head being broken away and shown in section.

In FIG. 1 there is shown a reader head 10 having an upper surface 12 along which punched tape or other optically significant encoded medium (not shown) is intended to be transported as indicated by the arrows 14. The reader head 10 has a recess or reading window 16 extending inwardly from the upper surface 12 and transversely of the direction of travel of the record medium.

A row of significant indicia of the record medium may be positioned above the window 16 to be interposed between a source of illumination (not shown) above the head and the bottom of the window 16. Rays of light not intercepted by the record medium pass through apertures or rejection tunnels 18 in the bottom of the window 16 to the surfaces of photovoltaic cells 20. A fiber optic strip 21 fitted in the window 16 and an etched image former 22 cooperate with the tunnels 18 to collimate the light rays in a conventional manner. The strip 21 is preferably precisely flush with the reader head surface 12.

The cells 20 are formed from a single silicon strip 23 into the upper surface of which suitable elements are diffused in order to constitute a typical photodiode. A series of parallel transverse grooves 26 are cut in the strip 23 to a depth greater than the diffusion layer whereby the cathodes of the cells are electrically isolated. As he grooves 26 are cut, separate contact segments 28 are formed from a common strip adhered to the surface of the silicon strip along one side thereof.

The silicon strip 23 extends along one long side of a generally rectangular glass or other suitable substrate 30 with the contact segments 28 located inwardly of the substrate edge. A contact layer 32 is coated on the substrate beneath the strip 23. The strip 23 is adhered to the contact layer 32 adequately to provide good electrical contact. The anodes of the cells are thus electrically common. Two other contact layers 34 and 36 are coated along the substrate for purposes presently to appear.

The signal across one of the contact segments 28 and the contact layer 32 may have nominal characteristics of generating 100 to 1,000 microamps at say 0.5 volts. In order to raise the signal level, an amplifier is provided for each cell 20. Moreover, the components of the amplifier are supported on the substrate 30 immediately adjacent the corresponding cells. The components are arrayed transversely of the substrate 30 in alignment with the cells.

Figure 2:
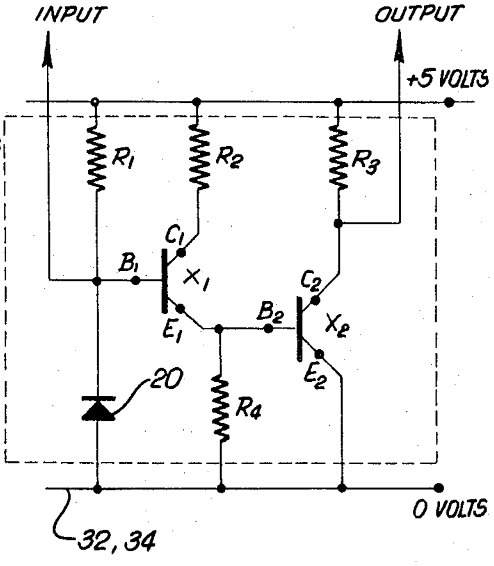
FIG. 2 is a wiring diagram of a typical amplifier circuit.

A typical amplifier suitable for present purposes is shown in FIG. 2. It comprises, in addition to the diode 20, two transistors X1 and X2 and four resistors R1, R2, R3 and R4. The transistors X1 and X2 are chips free of enclosure and may, by way of example, be of a type known as a 2N3643. The chip X (FIG. 1) is adhered to the substrate 30 between the contact layers 32 and 34. The other chip X2 is adhered to the substrate 30 between the contact layer 36 and the side edge of the substrate remote from the cell 20.

Figure 3:
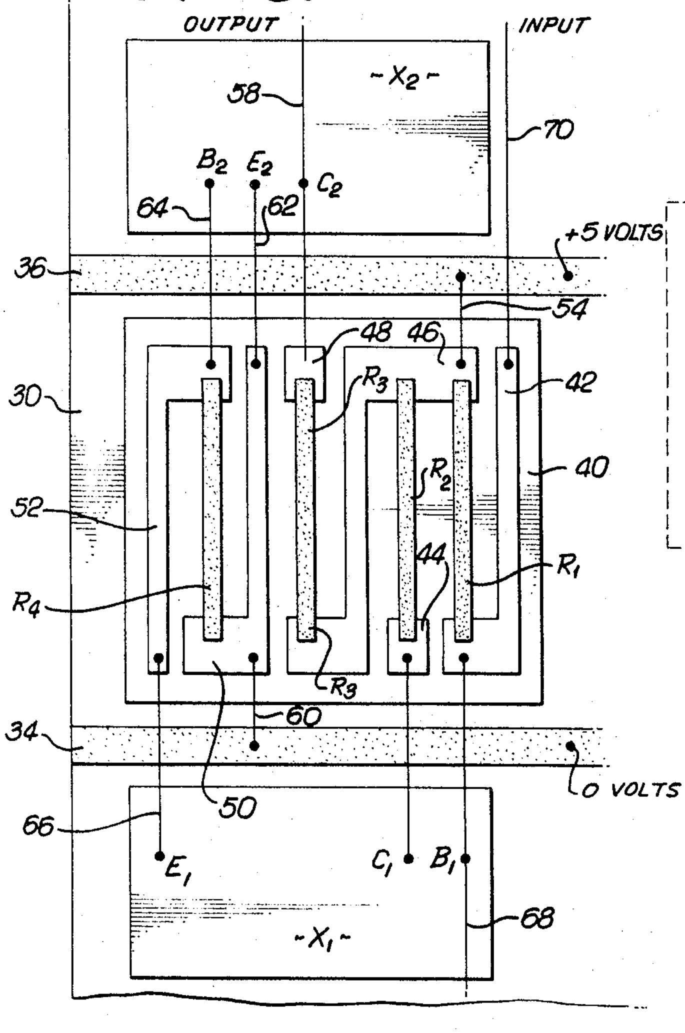
FIG. 3 is an enlarged plan view of a resistor chip for one of the amplifiers.

The resistor chip comprises printed conductors and resistors that may be directly coated on the substrate 30. Optionally, the resistor chip may be made as a packaged electronic component of a type manufactured and sold by Centralab division of Globe-Union, Inc. in which the conductors and resistors are coated on a ceramic substrate. By way of example, a packaged electronic component is shown in FIGS. 1 and 3.

A ceramic substrate 40 (FIG. 3) is adhered to the main substrate 30. Conductor segments 42, 44, 46, 48, 50 and 52 are coated on the ceramic substrate 40. The base B1 of transistor X1 (diagrammatically illustrated) is connected to an L-shaped segment 42. The resistor R1 is coated between the lateral of segment 42 and a lateral of a Z-shaped segment 46. A lead 54 connects the segment 46 to the common contact layer 36 which in turn is connected to a suitable DC power source. Resistor R2 is coated between the segment 44 and the lateral of the segment 46. A lead 56 connects the segment 44 to the collector C1 of the transistor X1. Resistor R3 is painted between another lateral of the Z-shaped segment 46 and a segment 48. A lead 58 connects the segment 48 to the collector C2 of transistor X2 (diagrammatically illustrated) and continues to form an output lead for the amplifier. A lead 60 connects the common contact layer 34 to the L-shaped segment 50. The layer 34 may be connected to the companion contact layer 32 that underlies the cells and to the opposite side of the power source. A lead 62 connects the segment 50 to the emitter E2 of the transistor X2. Resistor R4 is coated between a lateral of the L-shaped segment 52. A lead 64 connects the segment 52 to the base B2 of the transistor X2. A lead 66 connects the emitter E1 of transistor X1 to the segment 52. A lead 68 connects the contact segment 28 to the base B1 of transistor X1 and is continued where it connects to the segment 42. A lead 70 connects to the segment 42 so that the cathode of the cell is electrically available for test purposes.

The resistor package 38 may be coated with Durez or other suitable insulation material as appropriate.

The substrate 30, together with the photo cell and amplifier components, is fitted into the bottom of the reader head 10 which thus serves as a holder for these components. A suitable cable socket (not shown) may be affixed to the reader head and connections made to the leads 58 and 70 of all of the cells and to the common contact layers 32, 34 and 36, all in conventional manner. A cable 72 connects the reader to a remote apparatus incorporating logic circuits.

The entire reader unit is exceptionally compact. Due to the close proximity of the amplifier circuits with the cells, the amplifier circuit is not sensitive to noise. Furthermore, the output signals from the reader are of sufficient magnitude to be directly coupled to logic circuits.

I claim:

1. In an optical reader: a substrate; semiconductor strip means secured to the substrate and having a diffused layer in its upper surface to provide electrical properties sensitive to light; said semiconductor strip means having transverse groove means extending to a level beneath the diffused layer electrically to separate said semiconductor strip into a series of separate devices; contact segments secured to the upper surfaces of said devices; amplifiers for each of said devices including, for each amplifier, components supported on said substrate in transverse alignment with said devices and in close proximity thereto for producing a high level output signal substantially free of noise; and individual leads between the contact segment of each cell and it corresponding amplifier.

2. The reader as set forth in claim 1 in which each of said amplifiers includes a pair of transistor chips and a resistor chip; a plurality of longitudinally extending common contact layers for providing power connections for said amplifiers and leads interconnecting the chips and layers.

3. In a logic system: a logic package; a separate optical reader package; and cable connecting the packages; said reader including a reader head having a reading window; a substrate supported in the reader head; a plurality of light-sensitive cells supported in side-by-side relationship on said substrate with upper surfaces optically aligned with elementary portions of said window; an an amplifier for each of said cells having components supported on said substrate in transverse alignment with said cells in close proximity thereto for producing a high level output signal from the corresponding cells substantially free of noise; said amplifiers occupying successive rows extending transversely of said window.

4. The combination as set forth in claim 3 in which each of said amplifiers includes a pair of transistor and resistor chip means; a plurality of common contact layers coated on said substrate and extending parallel to said aligned cells for providing power connections for said amplifiers; and leads interconnecting the cells, chips and layers.

5. In a logic system: a logic package; a separate optical reader package; and cable connecting the packages; said reader including a reader head having a reading window; a substrate supported in the reader head; a semiconductor strip secured to said substrate and having an upper layer optically aligned with said window, said semiconductor strip having a diffused layer extending inwardly from said upper surface to provide photovoltaic properties; said semiconductor strip having transverse groove means extending to a level beneath the diffused layer electrically to separate said semiconductor strip into a series of separate photovoltaic cells; contact segments secured to the upper surfaces of said cells; and amplifiers for each of said cells including, for each amplifier, components supported on said substrate in transverse alignment with said cells and in close proximity thereto for producing a high level output signal substantially free of noise.

6. The combination as set forth in claim 5 in which each of said amplifiers includes a pair of transistor and resistor chip means; a plurality of common contact layers coated on said substrate and extending parallel to said aligned cells for providing power connections for said amplifiers; and leads interconnecting the cells, chips and layers.

7. In an optical reader: a substrate; a plurality of parallel contact layers extending along the substrate to provide power connections; a plurality of photocells arranged in a row along one of said contact layers, and each of said photocells in electrically conductive relationship thereto; a printed circuit for each of said photocells, said printed circuits being arranged in a row parallel to said row of photocells and secured to said substrate; transistor chip means for each of said photocells and arranged in a row parallel to said rows of photocells and printed circuits; the printed circuits and the transistor chip means being arrayed in transverse alignment with the corresponding photocells; and separate spaced leads interconnecting the corresponding photocells with the transistor chip means, the printed circuits and the contact layers for forming amplifiers for the photocells.

8. In an optical reader: a substrate: a plurality of light-sensitive cells supported on said substrate and extending in a row; each of said light- sensitive cells having a contact segment; and individual amplifier for each of said cells and located substantially in a row paralleling said row of cells, with amplifiers for said cells in substantially side-by-side relationship to the corresponding cells; and leads connecting said contact segments to the corresponding amplifiers; the close proximity of said amplifiers and said cells providing a high level output signal substantially free of noise.

9. The optical reader as set forth in claim 8 together with a separate logic package and a cable connecting said logic package to said reader.